United States Patent

Gallagher et al.

[15] 3,665,406

[45] May 23, 1972

[54] AUTOMATIC POLLING SYSTEMS

[72] Inventors: Frank William Gallagher, Norwalk; Richard C. Casey, Darien, bothof, Conn.

[73] Assignee: The Bunker-Ramo Corporation, Stamford, Conn.

[22] Filed: Apr. 13, 1970

[21] Appl. No.: 27,877

[52] U.S. Cl. ....................340/172.5
[51] Int. Cl. ....................G06f 9/18
[58] Field of Search ....................340/172.5

[56] References Cited

UNITED STATES PATENTS

| | | | |
|---|---|---|---|
| 3,245,038 | 4/1966 | Stafford et al. | 340/172.5 X |
| 3,396,372 | 8/1968 | Calvert | 340/172.5 |
| 3,407,387 | 10/1968 | Looschen et al. | 340/172.5 X |
| 3,509,539 | 4/1970 | Fichten et al. | 340/172.5 |

*Primary Examiner*—Raulfe B. Zache
*Attorney*—Frederick M. Arbuckle

[57] ABSTRACT

A device for generating polling messages to a plurality of addressable stations. A central processing unit (CPU) generates a polling table which is stored in an external automatic polling device. The polling device detects an address in the polling table and generates a polling message to the indicated station. The device receives responses to polling messages and tests to determine if they are positive or negative. A negative response causes a polling message to be sent to the station indicated by the next address in the polling table. A positive response causes an interrupt to the CPU which then receives the reply message. Interrupts to the CPU may also be generated when there is no response to a polling message, when there is an error response, or when the end of the polling table is reached.

22 Claims, 5 Drawing Figures

INVENTORS
FRANK W. GALLAGHER
RICHARD C. CASEY
BY

AUTOMATIC POLLING SYSTEMS

This invention relates to a system for polling a plurality of remote stations to determine which, if any, have a query or other message to transmit, and more particularly, to a relatively simple and easy to use device which significantly reduces the number of interrupts to a central processing unit (CPU) during a polling operation.

There are, at present, an ever increasing number of applications where a CPU is queried by a large number of remote locations to obtain selected information stored therein. The systems which have been developed for these applications generally provide an input/output terminal device at each remote location or station which device is connected to the CPU through a communications line. While in some of these systems, information is transmitted from a terminal to the CPU as soon as the terminal has a message to transmit, in most systems the messages are initially stored at the terminal, or at a regional concentrator serving a plurality of terminals. The CPU continuously polls the stations in some predetermined sequence to determine which, if any, have a query or other message to transmit. A station, when it is polled, may either respond by transmitting a stored message or may transmit a non-traffic response indicating that it has no message to send. There is also a possibility that the station will not respond at all to a poll message. This can occur if a station has been turned off, disconnected from the line, or is malfunctioning for some reason.

In systems of this type, an interrupt to the CPU must be generated each time the computer sends a poll message, each time the computer receives a reply message, and generally after the reply message has been analyzed to permit the computer to either generate an appropriate response or to generate a poll to the next station in sequence. Thus, the CPU is interrupted three times for each poll message even though, on the average, only about one in ten poll messages results in a positive response. Thus, in most existing query and response systems, substantial CPU time is wasted in polling operations and the CPU's operating efficiency is thus relatively low.

In order to improve the operating efficiency of the CPU, some systems have placed a small preprocessor between the communications lines and CPU. This preprocessor is programmed to perform the polling operation and sends polling responses on to the CPU only if a positive response is received or if a station fails to respond to poll. The use of such a preprocessor significantly improves the operating efficiency of the CPU. However, the preprocessor itself is a relatively complicated and expensive device, and must be programmed to perform the polling operation. If any change in the polling sequence, polling format, or other related items is desired, reprogramming is required, both at the CPU and the preprocessor. Since these devices are seldom program-compatible, this requires that instructions be written in two different programming languages and significantly increases the complexity of operating the system.

It is thus apparent that a need exists for a simple, relatively inexpensive, easy to operate device for reducing the number of interrupts to a CPU resulting from the polling by the CPU of a plurality of remote stations. Such a device should permit changes in the stations to be polled, or the polling sequence to be controlled directly from the CPU.

It is, therefore, a primary object of this invention to provide an improved system for polling a plurality of remote stations.

A more specific object of this invention is to provide a simple, relatively inexpensive and relatively easy to operate device for reducing the number of interrupts to a CPU resulting from a polling operation.

Another object of the invention is to provide a system of the type indicated above which permits changes in the stations to be polled, the poll sequence, and the like to be controlled directly by the CPU.

In accordance with these objects this invention provides a device for generating polling messages to a plurality of addressable stations. The device includes a means for storing a table of addresses of the stations in the order in which the stations are to be polled. This table is applied to the storing means by an external device such as a CPU. Each device also includes a means for detecting a selected station address in the table and a means responsive to the address detection for generating a polling message to be sent to the addressed station. The latter means is also operative to designate a subsequent address in the address table as the selected station address for a subsequent poll message. Means are provided which operate in response to a negative poll-response message for causing the detection means to detect the designated subsequent address. A positive response to a polling message causes the device to generate an output message. Finally, means are provided which operate in response to one or more conditions of the device, including selected types of poll responses, for causing a new polling table to be applied to the table storing means. Conditions which would cause the application of a new polling table to the storing means, could, for example, include a positive response to a poll message, no response to a poll message, or an indication that the end of the polling table has been reached.

The foregoing and other objects, features and advantages of the invention will be apparent from the following more particular description of a preferred embodiment of the invention, as illustrated in the accompanying drawings.

Figure 3A:
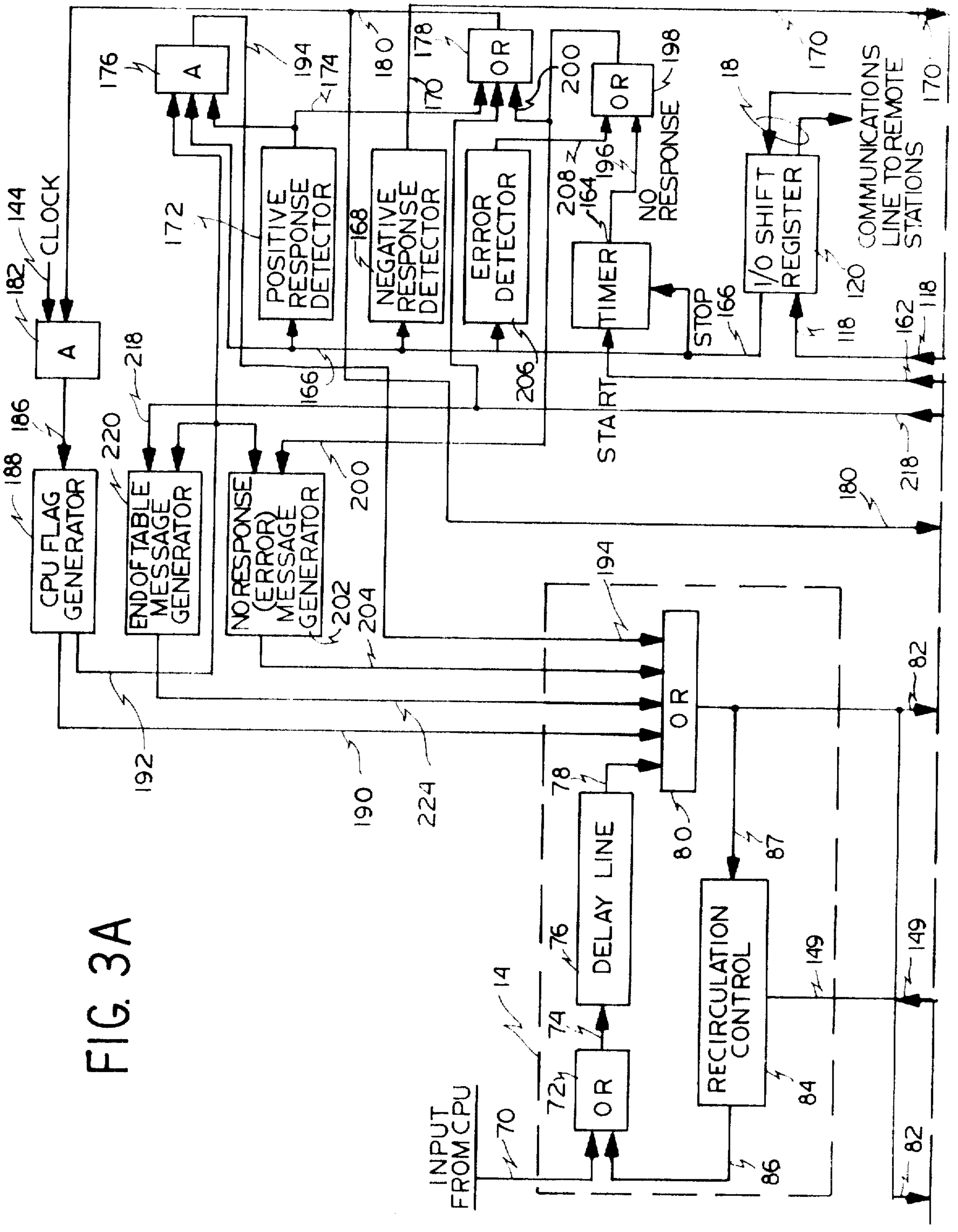
Figure 3B:
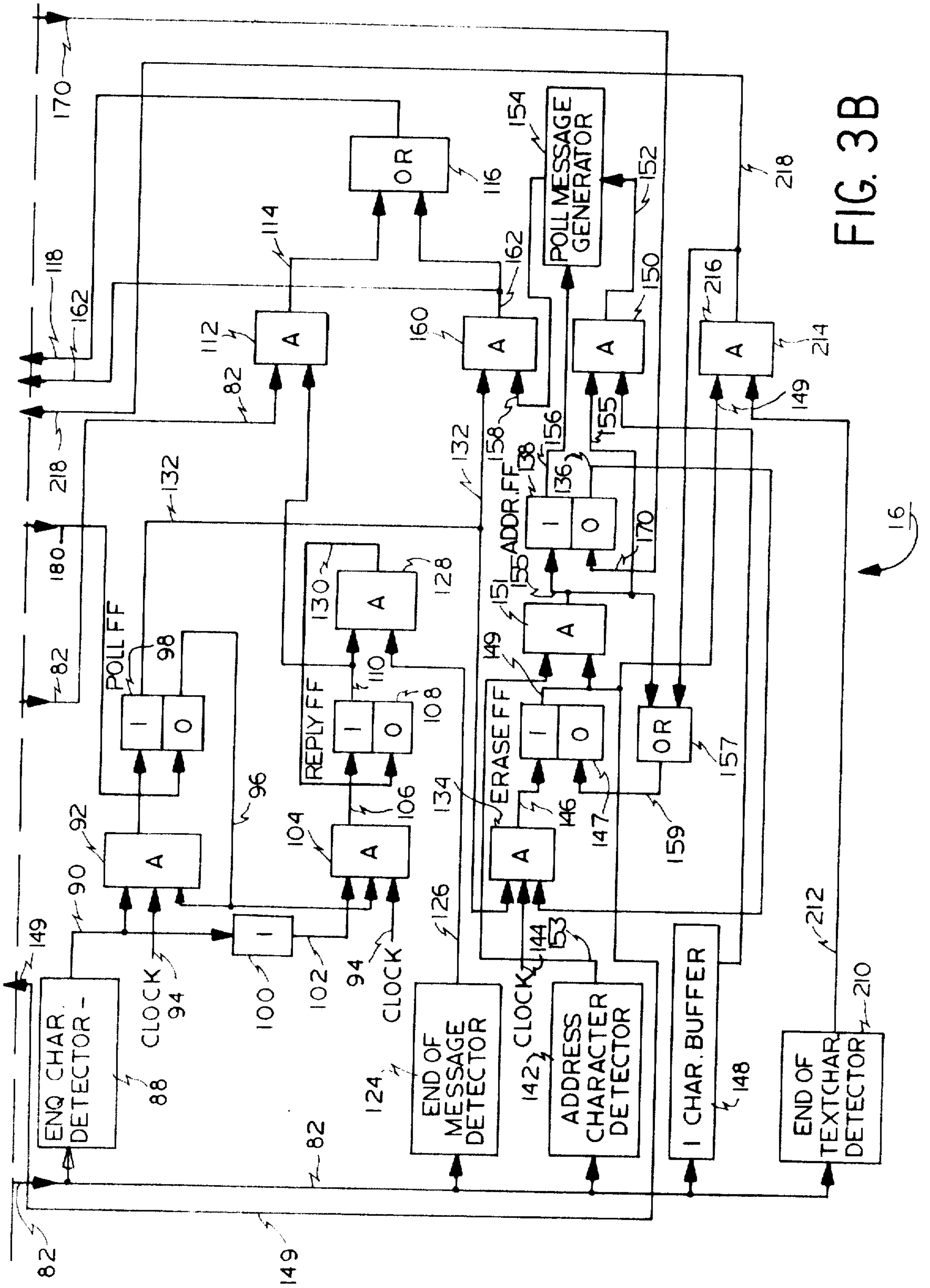

FIG. 3A and 3B, when combined, form a block schematic diagram of an embodiment of the device of this invention.

Figure 4:
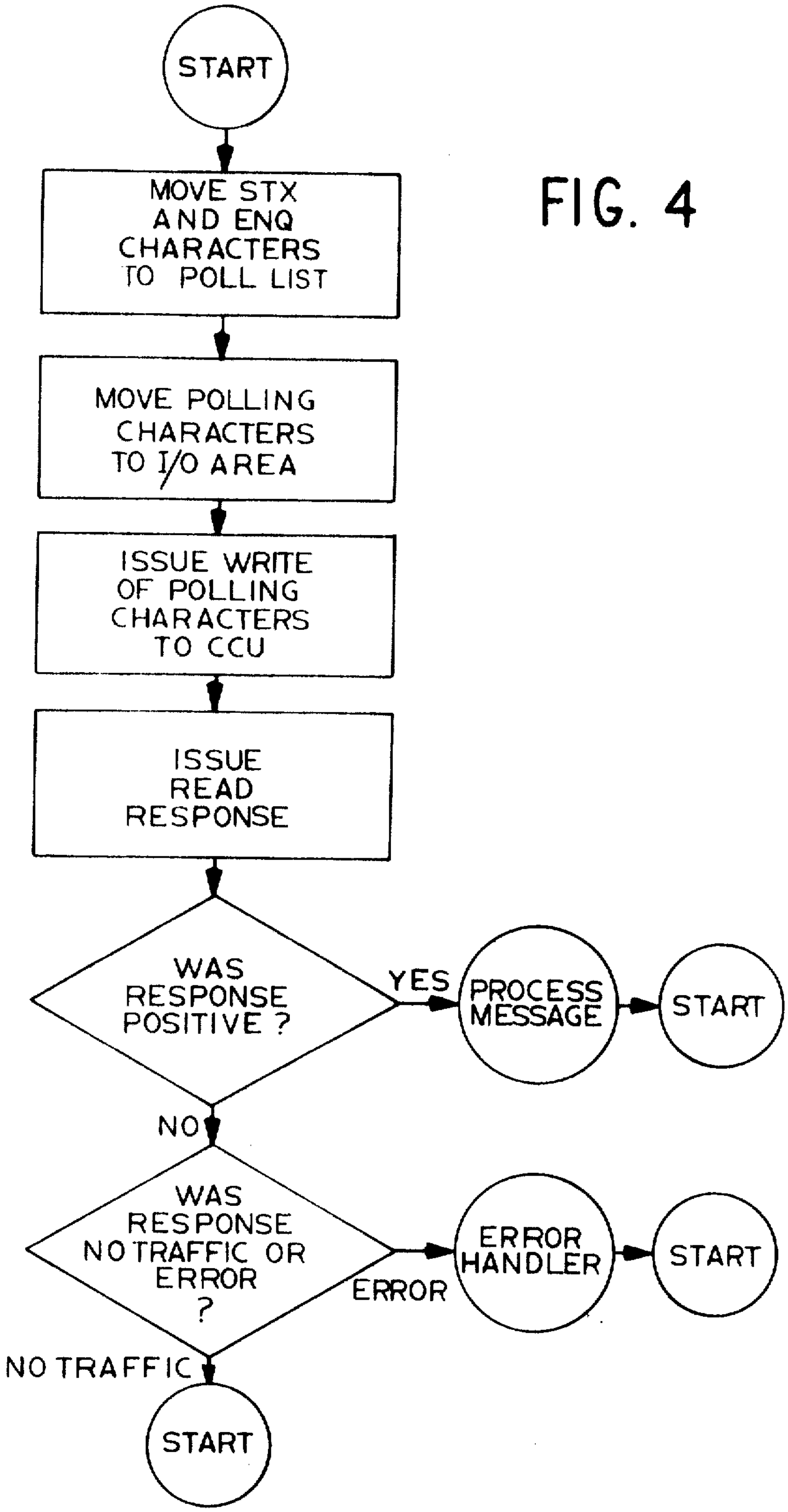

FIG. 4 is a flow diagram of the CPU operations required in conjunction with the device of this invention.

GENERAL SYSTEM DESCRIPTION

Figure 1:
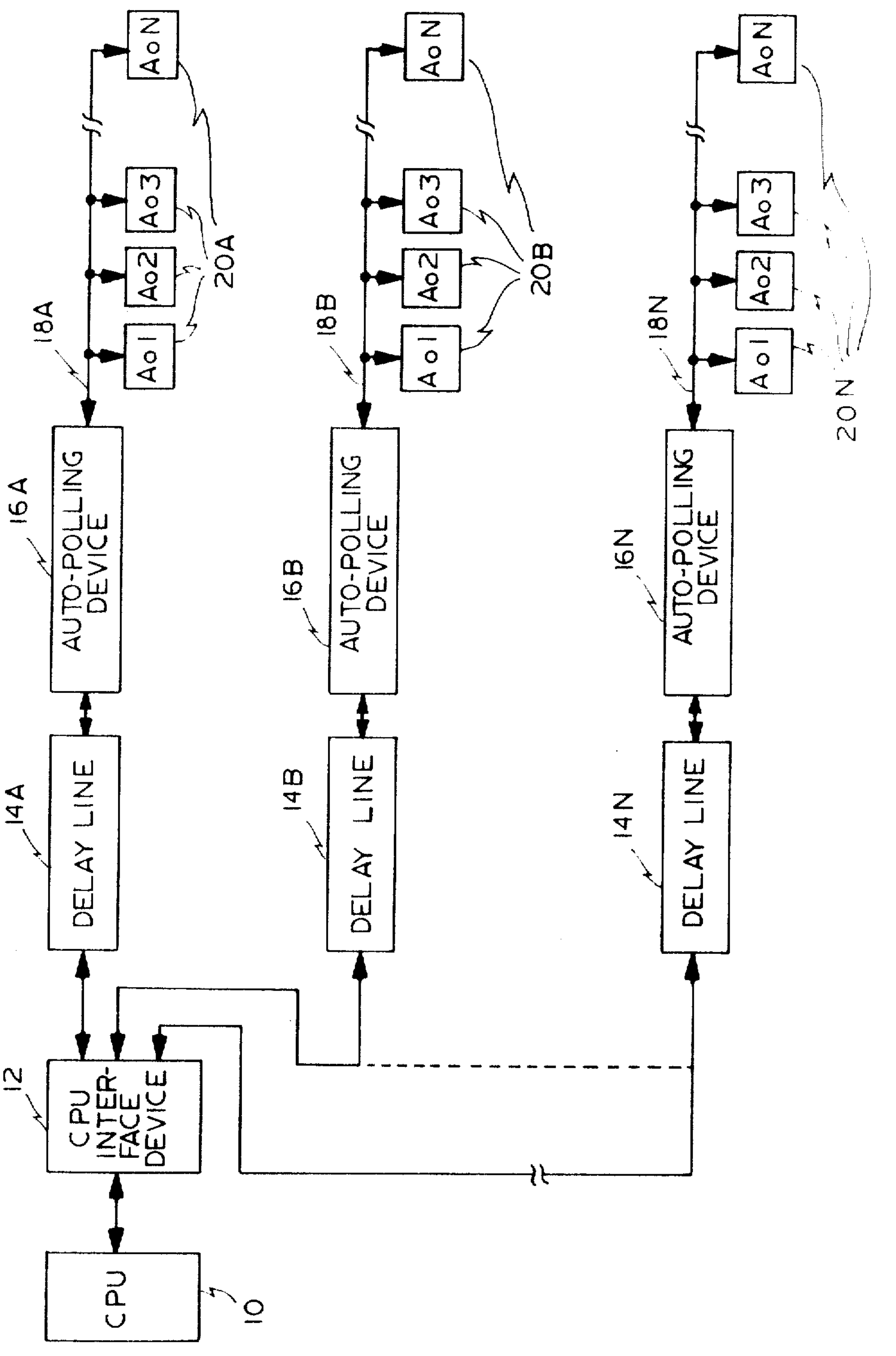
FIG. 1 is a block diagram of a system utilizing the automatic polling device of this invention.

Referring now to FIG. 1 it is seen that a query response system utilizing the teachings of this invention includes a central processing unit (CPU) 10 which is connected through a CPU interface device 12 to a plurality of delay-line storage devices 14. Interface 12 multiplexes messages in both directions between the CPU and delay devices 14 and performs other standard housekeeping functions. Delay devices 14 may have stored in them by the CPU a polling table in a form which will be described shortly, a reply to a query, or some other message to be sent to a remote station. Delay devices 14 are also utilized to store replies to be sent to the CPU. The information in each delay device is applied to an automatic polling device 16 which utilizes this information to generate polling messages or to transmit messages from the CPU over a transmission line 18 to one of a plurality of remote stations 20. Transmission line 18 may, for example, be a telephone line. Each message applied to line 18 contains an address which is recognized and responded to by the indicated remote station.

The polled remote station 20 may send back a reply over communications line 18 or may send an indication over the line that it has no message to transmit. Reply messages from remote stations are stored in delay device 14. If a polled station sends a no-response message, device 16 generates and sends a poll message to the next station indicated by the poll table. If a polled station fails to respond to a poll, or generates an error-response, or if the end of the poll table is reached, device 16 stores an appropriate response message in delay device 14. Response messages in delay device 14 are transmitted through interface 12 to CPU 10.

Since, as will be seen shortly, the CPU becomes involved in the operation only under very limited conditions, a single CPU and interface may be utilized to service a large number of communication channels without overloading the CPU.

FUNCTIONAL DESCRIPTION OF AUTOMATIC POLLING DEVICE

Figure 2:
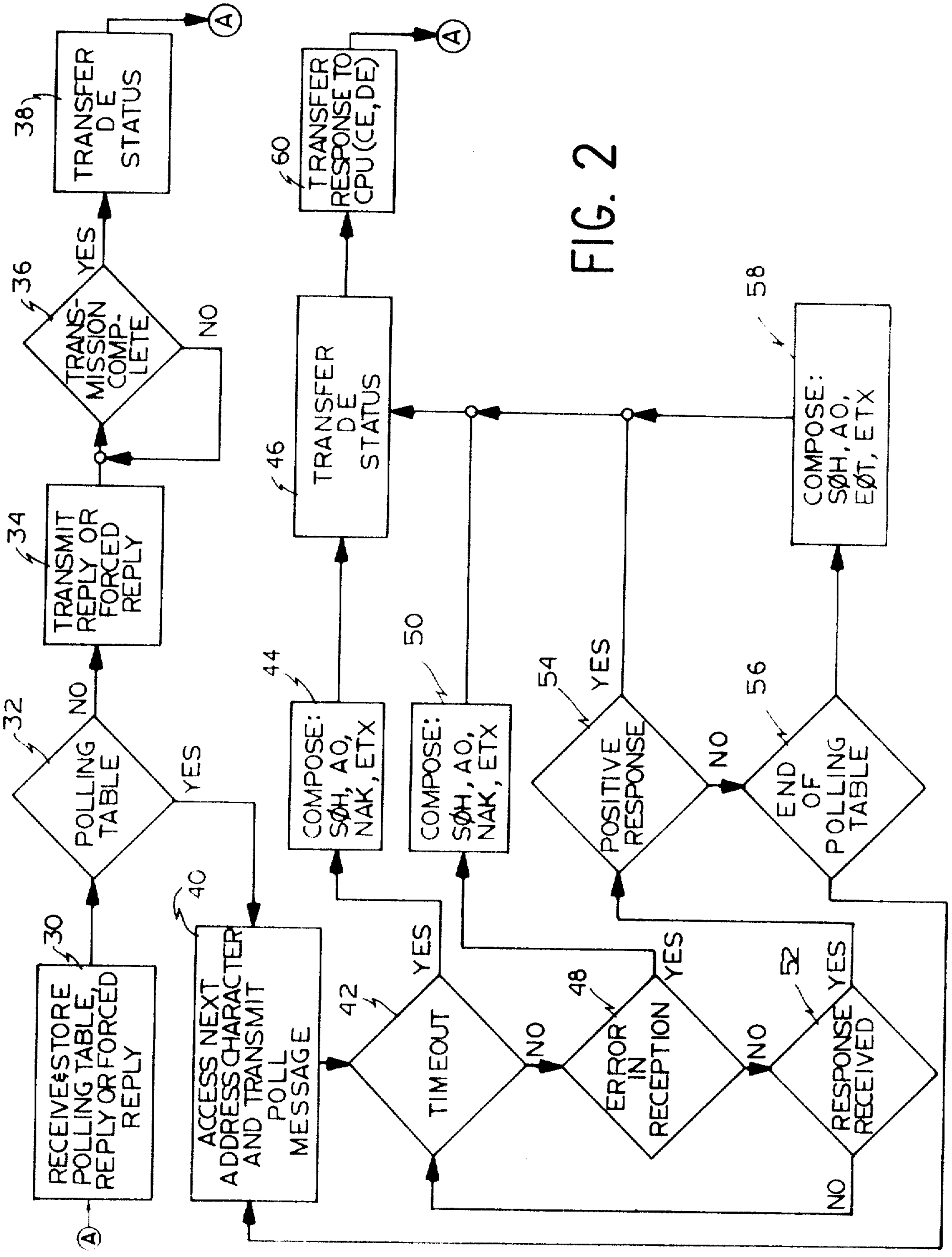
FIG. 2 is a functional flow diagram of the device of this invention.

FIG. 2 is a flow diagram indicating how an auto-polling device 16 is utilized in conjunction with delay device 14 to reduce the load on CPU 10 during a polling operation. Referring to FIG. 2 it is seen that the message received at A from CPU 10 is stored in delay device 14 as indicated in block 30. The message from the CPU may be a reply to a previous query from a remote station, a forced reply which is a message from the CPU generated other than in response to a query, or a polling table which is stored in the delay line and utilized, as will be seen shortly, to indicate the sequence in which a number of remote stations 2O on a line 18 are to be polled. A message containing a polling table consists of the following character sequence:

S0H, STX, ENQ, AO1, AO2 ... AON, ETX where:

S0H is a start of header character.

STX is start of text character.

ENQ is an inquiry character and is utilized to indicate that the message is a polling table.

AO1, AO2, ... AON are addresses of remote stations 2O arranged in the order in which they are to be polled.

ETX is an end of text character.

The message stored in delay device 14 is sampled by auto-polling device 16 to determine if the message stored therein is a polling table. This operation is indicated by decision box 32. If the message stored in delay device 14 is not a polling table, auto-polling device 16 causes the reply or forced reply to be directly transmitted over communications line 18 to the addressed remote station 2O, as indicated by block 34. The transmit operation continues until the entire message has been completed as indicated by block 36, at which time the system reverts to a receive (data entry) status waiting for a new message from the CPU, as indicated by block 38.

If an ENQ character is detected in the message, indicating that the message is a polling table, the sequence of operations proceeds from block 32 to block 40. Auto-polling device 16 then scans delay device 14 to find the first address character AO1 in the polling table and utilizes this address character to generate a poll message to the AO1 remote station 2O.

Auto-polling device 16 has a timing device in it which starts to run when the poll message is transmitted. If a response from the polled station is not received within a predetermined time after the polling message is sent, timeout box 42 has a "yes" output which causes an error-response message (S0H, AO, NAK, ETX) to be generated by the auto-polling device and stored in delay device 14. These two operations are indicated by boxes 44 and 46 respectively of FIG. 2.

A response which is received from a remote station 2O is checked to determine if it has a parity or other error. If such an error is detected in box 48, an error message, which looks the same as a no response message, is generated by the auto-polling device, as indicated by box 5O, and stored in the delay device. If a response is received which does not contain an error, there is a "yes" output from box 52. This response is tested to determine if it is a positive or negative response in box 54. If it is a positive response, the positive response message is stored in the delay device. If there is a negative response output from box 54, the auto-polling device tests to determine if the end of the polling table has been reached. This operation is indicated by box 56. If the end-of-the-polling table has not been reached, the circuit returns to the operation indicated by box 40 to look for the next address character in the polling table. When this address is found, the operations described above are repeated for the next station in the polling sequence.

If box 56 generates a positive response indicating that the end of the polling table has been reached, an end-of-table message is generated by the auto-polling device, as indicated by block 58, and stored in delay device 14. As was indicated previously the CPU periodically scans each delay device 14. Any message stored in a scanned delay device is transferred to the CPU, as indicated by block 60 of FIG. 2. After the CPU has analyzed the response, the system returns to block 30 with the CPU storing a message, such as for example another polling table, in delay device 14.

DETAILED DESCRIPTION OF PREFERRED EMBODIMENT

FIGS. 3A and 3B combine to form a detailed block diagram of a single delay device 14 and auto-polling device 16. An input on line 70 from CPU 10 (generally through CPU interface device 12) is applied through OR gate 72 and line 74 to be stored in delay line 76 of the delay device 14. The message stored in delay line 76 may be a reply to a previous query from a remote station 2O, a forced-reply message to one or more of the remote stations, or a polling table in the form previously indicated. In order for delay device 14 to function as a storage device, information in delay line 76 is recirculated through a path which includes line 78, OR gate 80, line 82, recirculation control device 84, line 86, OR gate 72 and line 74. Recirculation control circuit 84 may consist of reshaping and amplifying circuits to maintain the information recirculated in the delay line, as well as various registers and flip-flops to permit editing functions such as erase, insert, delete and the like, to be performed on the recirculated information.

In addition to being applied to recirculation control device 84, the information on line 82 is also applied to various special character detectors. The presence of a polling table in delay line 76 may be detected in auto-polling device 16 in one of two related ways. In some applications of the system, interface device 12 scans each message as it is applied to the delay line and generates a character which is stored at the beginning of the message. The binary state of various bits in this character indicates the presence or absence of a message, whether the message is a polling table or not, and other information. Thus, ENQ character detector 88 (FIG. 3B) may merely be a device for detecting the presence of a bit in the poll-table bit position of a character. An output signal from detector 88 is applied through line 90 to one input of AND gate 92. The other inputs to this AND gate are clock line 94 which has a signal on it when the character at the beginning of the message appears on line 82 and ZERO-side output line 96 from poll flip-flop 98. Thus, if a poll table is not then being utilized to control a poll operation, and it is detected that a poll table is stored in delay line 76, poll flip-flop 98 is set to its ONE state.

If presensing is not performed in interface device 12, detector 88 could then contain a flip-flop which is set if the first bit of a character is the same as the first bit of an ENQ character and is reset when a mismatch is detected between a bit of the ENQ character and a bit of the detected character. If, at the end of a character, the flip-flop in detector 88 is still set, detector 88 generates an output on line 90. Under these conditions, the clock on line 94 would be a character 3 clock since, from previous discussion, it will be remembered that this is the character position of a poll-table message in which the ENQ character is stored. From this point on, the operation of setting poll flip-flop 98 is the same as described above.

If detector 88 does not generate an output on line 90, inverter 100 generates an output on line 102 which is applied as one input to AND gate 104. The other inputs to AND gate 104 are clockline 94 and ZERO-side output line 96 from poll flip-flop 98. Thus, if at the appropriate clock time, an indication is received that the message stored in delay line 76 is not a poll table, and the circuit is not at the time performing a polling operation, AND gate 104 is fully conditioned to generate an output on line 106 which is applied to set reply flip-flop 108 to its ONE state.

When flip-flop 108 is in its ONE state, a signal appears on ONE-side output line 110 which signal is applied as one input to AND gate 112. The other input to AND gate 112 is delay-device output line 82. Thus, when flip-flop 108 is set, AND gate 112 is conditioned to pass the message in delay line 76 through line 114, OR gate 116, and line 118 to input/output (I/O) shift register 120 (FIG. 3A). The information stored in register 120 is applied through communications line 18 to the remote station 20 addressed by the transmitted message.

The device continues to apply message characters from delay line 76 to shift register 120 for transmission until end-of-message detector 124 (FIG. 3B) detects an end-of-message character on line 82. End-of-message detector 124 may operate in the same manner as the ENQ character detector previously described. The detection of an end-of-message character by detector 124 causes an output signal on line 126 which is applied as one input to AND gate 128. The other input to AND gate 128 is reply flip-flop ONE-side output line 110. Thus, when the reply flip-flop is set and an end-of-message character is detected, AND gate 128 is fully conditioned to generate an output signal on line 130 which is applied to reset the reply flip-flop.

When a poll table is stored in delay line 76 and poll flip-flop 98 is set to its ONE state, the resulting signal on poll flip-flop ONE-side output line 132 is applied as one input to AND gate 134. The other inputs to AND gate 134 are ZERO-side output line 136 from address flip-flop 138 and clock line 144. A signal appears on clock line 144 when the beginning of a message appears on line 82 (i.e. at the first clock tome for delay device 14). When AND gate 134 is fully conditioned, the resulting output signal on line 146 is applied to set erase flip-flop 147 to its ONE state. The erase flip-flop is thus set to its ONE state at the first zero clock time of the delay device after poll flip-flop 98 is set to its ONE state. ONE-side output line 149 from erase flip-flop 147 is connected as an erase input to recirculation control circuit 84. The setting of the erase flip-flop to its ONE state thus causes characters, starting with the first character of the poll message in delay device 14, to be erased.

Line 149 is also connected as one of the inputs to AND gate 151. The other input to AND gate 151 is output line 153 from address character detector 142. In the coding scheme used for the system, address characters have a unique configuration which permits them to be readily identified. For example, in ASCII code, bits 6 and 7 of an address character have a unique configuration. Detector 142 is adapted to respond to the unique configuration of an address character by generating an output on line 153. Thus, when erase flip-flop 147 is set and an address character is detected on the output from delay line 76, AND gate 151 is fully conditioned to generate an output on line 155 which is applied to set address flip-flop 138 to its ONE state, is applied through OR gate157 and line 159 to reset erase flip-flop 147 to its ZERO state, and is applied as a conditioning input to AND gates 150. As each character appears on line 82, it is stored in one character buffer 148. The contents of this buffer are continuously applied as one set of inputs to AND gates 150. When a signal appears on line 155, indicating that an address character has been detected and thus that an address character is stored in buffer 148, gates 150 are conditioned to pass the address in buffer 148 through lines 152 to be stored in an appropriate character position of poll message generator 154. The resetting of erase flip-flop 147 prevents address characters in the poll table following that which was detected by detector 142 from being erased. The detected address character is, however, erased prior the resetting of flip-flop 147, thus assuring that the next time the circuit looks for an address character in the poll table, the first address character it will find is the address character following that which was just detected.

ONE-side output line 156 from address flip-flop 138 is applied to poll message generator 154 to cause the contents thereof to be outputed on line 158. A poll message consists of the following characters:

SOH, AO, ENQ, ETX where each of the characters has the significance previously ascribed to it, AO being the address of the station being accessed by the message.

Poll message generator 154 may include four serially connected shift registers, three of which are loaded from appropriate character generators, and the fourth of which, the address register, is loaded by signals on line 152. A signal on line 156 would then cause the contents of these registers to be serially shifted out onto line 158. In the alternative, registers hard wired to contain the desired characters could be sequentially sampled under control of a signal on line 156 to obtain the desired output on line 158.

Poll message bits on line 158 are applied as inputs to AND gate 160 which gate is conditioned by ONE-side output line 132 from poll flip-flop 98. Poll characters on output line 162 from AND gate 160 are applied through OR gate 116 and line 118 to input-output shift register 120. As indicated previously, characters stored in register 120 are applied through communications line 18 to the appropriate remote station. The first signal on line 162 is also applied as a start input to timer device 164 (FIG. 3A). The function of this device will be described shortly.

A reply message from a remote station 20 is received on transmission line 18 and stored in the left-most empty position of shift register 120. Since a number of characters may be stored in register 120, the register may serve as a buffer between communications line 18 and delay device 14.

Assume intitially that the polled station generates a negative response indicating that it does not have a message to transmit. The negative response appearing on register output line 166 is detected by negative response detector 168 causing an output to appear on line 170 which is applied to reset address flip-flop 138 to its ZERO state. Negative response detector 160 may be similar to detectors 88, 124, etc. and is set to detect a unique character in a response message which appears only in negative responses. The resetting of flip-flop 138 to its ZERO state reconditions AND gate 134 permitting erase flip-flop 147 to be set at the beginning of the next delay device cycle. Flip-flop 147 being set causes auto-polling device 161 to start looking for the next address in the poll table stored in delay line 76 to which a poll message is to be sent (i.e. the first unerased address in the poll table). When this address id detected, it is erased and flip-flop 138 is again set to its ONE state causing a poll message to be sent to the station having the detected address. The procedure for performing this operation is the same as that described above.

The above-described sequence of operations is repeated each time a polled station generates a negative response. When a station is polled which has a message to transmit, the received message contains a character which triggers positive response detector 172. The resulting output on line 174 is applied as a conditioning input to AND gate 176 and is also applied through OR gate 178 and line 180 to reset poll flip-flop 98 to its ZERO state and as one input to AND gate 182. The resetting of poll flip-flop 98 to its ZERO state terminates the polling operation. At the beginning of the delay line cycle, a signal appears on clock line 144. This clock pulse fully conditions AND gate 182 to generate an output on line 186 which is applied to set CPU flag generator 188. The resulting output signals on line 190 are applied through OR gate 80 to the recirculation path of delay device 14, causing a CPU flag character to be stored in the beginning of the delay line. The CPU monitors the delay device looking for this character and generates an interrupt to receive a message when this character is detected.

The setting of CPU flag generator 188 also causes an output signal to be generated on line 192 which signal is applied as the other conditioning input to AND gate 176. AND gate 176 is thus fully conditioned to pass the received message coming from register 120 on line 166 through line 194 and OR gate 80 to be stored in delay device 14. As this message is stored in the delay device, it overwrites and thus effectively erases the polling table which was previously stored therein.

As was indicated previously, timer 164 is started each time a polling message is applied to shift register 120. Normally, a response, either positive or negative, is received from a polled station before a time-out in timer 164 occurs. The appearance of this response on line 166 causes the timer to be stopped or reset. However, if a response to a polling message is not received within a prescribed period of time, for example 100 milliseconds, timer 164 generates an output signal on line 196. This signal is applied through OR gate 198 to line 200. The signal on line 200 is applied as one conditioning input to no-response (error) message generator 202 and through OR gate 178 to line 180. The signal on line 180 functions, as previously described, to reset poll flip-flop 198 and to cause a CPU flag character to be stored in delay line 76. When a signal appears on line 192 from flag generator 188, generator 202 is fully conditioned to generate a no-response or error message on line 204. This message, which is the same for both conditions, consists of

S0H, AO, NAK, ETX

The message on line 204 is applied through OR gate 80 to be stored in delay device 14.

Characters appearing on line 166 are analyzed by an error-detection circuit 206 which checks for parity errors and other conditions. If an error conditions is detected, a signal appears on error line 208. A signal on line 208 is applied through OR gate 198 to line 200 and causes the same operations to be performed as the before-described no-response signal on line 196.

If the system continues to receive negative responses to poll messages until all addresses in the poll table have been utilized, a condition will arise where erase flip-flop 147 is set looking for an address character and an ETX (end-of-text) character is detected by end-of-text character detector 210. The resulting output signal on line 212 is applied as one input to AND gate 214, the other input to this AND gate being ONE-side output line 149 from the erase flip-flop. AND gate 216 is thus fully conditioned to generate an output signal on line 218 which is applied as one of the conditioning inputs to end-of-table message generator 220, through OR gate 157 to reset erase flip-flop 147 and through OR gate 179 to line 180. The signal on line 180 functions, as before, to reset poll flip-flop 98 and to cause the CPU flag character to be stored in delay device 14. The resulting signal on line 192 fully conditions generator 220 to generate an end-of-table message on line 224. This message is applied through OR gate 80 to be stored in delay device 14.

FUNCTIONAL DESCRIPTION OF CPU OPERATION

At the CPU, an address table or poll list for the desired polling sequence is stored in memory. From the flow chart of FIG. 4, it is seen that when the CPU receives a command to generate a polling table, the first step in the operation is to transfer an STX and an ENQ character to the stored poll list. The polling characters are then moved to the I/O area of the CPU and a command is issued to the communications control unit (CCU) to write the stored polling characters.

Once these operations have been completed, the CPU does not need to perform any further function until a CPU flag character is detected in a delay line 14. The CPU then generates an interrupt and issues a read command to obtain the stored response from the delay line. The received response is analyzed by the CPU to determine if it is a positive response. If it is, it is processed in the CPU and an appropriate reply message generated in a standard manner. If the response is not a positive response, it is tested to determine if it is a no-traffic (i.e. end-of-table) message or an error (no-response) message. The detection of an error message causes the CPU to enter a proper routine to analyze and take appropriate action as a result of the error. In some cases the action is merely to ignore the particular response and to poll the offending station again. The no-traffic indication causes the system to return to a start condition to generate a new polling table. After the system has completed processing a positive response, or analyzing an error response, it also returns to a start condition to cause a new polling table to be generated.

From the above, it is apparent that the CPU has complete control of the polling operation, even though the amount of CPU time which is utilized for polling has been significantly reduced, and that changes in the station's polled or the order in which stations are polled may be easily effected. For example, the system may easily remove a station from the polling sequence by merely altering the state of either the sixth or seventh bit of the station address in the address table which is stored at the CPU. This may be done for example, when a predetermined number of consecutive no-response indications are received from a particular station. The time period before the station is again polled may again be controlled by the CPU. A station may also be removed from the polling sequence if the CPU knows ahead of time that the station will not come on line until a particular time or will go off line at a particular time. Information of this type may be prestored and programmed into the CPU or may be obtained as a result of messages from the remote station.

The polling sequence may also be varied with time either as a result of a preset polling algorithm which varies the polling time in accordance with predicted traffic patterns or in accordance with some programmed algorithm as a result of actually received traffic patterns. Since the polling sequence is determined by the order in which addresses are stored in an address table in the CPU memory, any change in the polling sequence may be easily effected.

While in the preferred embodiment of the invention described above, polling table addresses are erased as they are utilized and a new polling table is generated when the end of a polling table is reached, or if a positive response, no response, or error condition are detected, the invention could be slightly modified to further reduce communications between the CPU and the auto-polling device. For example, if instead of erasing an address in the polling table when it is utilized, either the sixth or seventh bit in the character is altered, then the auto-polling device could continue to generate poll messages indefinitely until a non-negative response is received. This could be done by either restoring the altered bit of each address character to its initial condition during a spin of the delay device when an end-of-table condition is detected, or by transferring a flip-flop when this condition is detected so that, for one pass through the polling table, address characters are identified by a particular configuration of the sixth and seventh bit, and for the succeeding pass through the polling table, addresses are recognized by an alternate configuration of the sixth and seventh bit. Another possibility would be to include an extra cursor bit for each character in the delay line which bit is advanced in a standard manner each time a poll message is generated. The address having a bit in the extra-bit position would be the address of the next station to which a poll message would be transmitted.

Procedures such as those outlined above could also be followed in situations where the polling sequence is unlikely to change over an extended period of time. Under these conditions, a separate area in delay line could be provided for receiving responses and the polling operation could continue where it left off after each response is generated to the CPU without requiring the transmission of a new polling table.

It is also apparent that, while a delay line device 14 has been shown for the preferred embodiment of the invention, other similar recirculating memory devices such as drum, disk or the like could be utilized to store the polling table, and that other similar changes could be made in the specific components shown, and in the coded characters utilized to control the various functions performed. Thus, while the invention has been particularly shown and described with reference to a preferred embodiment thereof, it will be understood by those skilled in the art that the foregoing and other changes in form and detail may be made therein without departing from the spirit and scope of the invention.

What is claimed is:

1. A device for generating polling messages to a plurality of addressable stations comprising;

means for storing a table of addresses of said stations in the order in which they are to be polled;
means for applying said table to said storing means;
means for detecting a selected station address in said table;
means responsive to said address detection for generating a polling message for sending said polling message to the addressed station, and for designating a subsequent address in said address table as said selected station address;
means responsive to a negative response to a polling message for causing said detection means to detect said subsequent address; and
means responsive to a positive response to a polling message for generating an output message from said device.

2. A device of the type described in claim 1 including means for detecting one or more conditions at said device including selected types of poll responses;
and means responsive to said condition detecting means for causing said table applying means to apply a new polling table to said table storing means.

3. A device of the type described in claim 2 wherein said condition detecting means includes means for detecting that the stations represented by all addresses in said polling table have been polled.

4. A device of the type described in claim 2 wherein said condition detecting means includes means for detecting a positive response or a no-response to a poll message.

5. A device of the type described in claim 2 wherein said condition detecting means includes means for detecting a positive response or a no-response to a poll message.

6. A device of the type described in claim 1 wherein said selected station address is the first uninhibited address in said polling table; and
wherein said subsequent address designating means includes means for inhibiting subsequent detection of said selected address.

7. A device of the type described in claim 6 wherein said inhibiting means includes means for erasing said selected address from said table storing means.

8. A device of the type described in claim 1 wherein said table storing means may also store other messages and including means for detecting that a polling table is stored in said storing means; and means responsive to said polling table detecting means for enabling said selected address detecting means.

9. A device of the type described in claim 1 wherein said table applying means is connected to receive table inputs from a CPU.

10. A device of the type described in claim 9 wherein there are a plurality of said devices, each of which generates polling messages to, and receives responses from, a different plurality of remote stations; and wherein a single CPU is connected to the table applying means of all of said devices.

11. A device of the type described in claim 1 including means for indicating that a predetermined period of time has passed since a poll message to a station was generated; and means responseive to said indicating means for generating a noresponse output message from said device.

12. A device of the type described in claim 11 including means responsive to said no-response indicating means for inhibiting said selected address detecting means.

13. A device of the type described in claim 12 including means responsive to said no-response indicating means for causing said table applying means to apply a new polling table to said storing means.

14. A device of the type described in claim 1 wherein said selected station address detecting means includes means for detecting that the stations represented by all the addresses in said polling table have been polled; and including means responsive to said detecting means for generating an end-of-table output message from said device.

15. A device of the type described in claim 1 including means for receiving a response to a poll message; means for detecting an error in said response; and means responsive to said error detecting means for generating an error output message from said device.

16. A device of the type described in claim 1 including means for storing a poll response message in said storing means; a response-utilization means connected to receive responses from said device; and means for storing a flag character with said response message to alert said utilization means that said device has a message to send.

17. A device of the type described in claim 16 wherein said response utilization means is a CPU.

18. A device of the type described in claim 16 wherein said pole response storing means includes means for storing a response message in place of said polling table in said storing means.

19. A device of the type described in claim 1 including means in said device for generating output messages in response to the detection of selected poll responses and other conditions; and means operative when an output message is generated for inhibiting said selected address detecting means.

20. A method of generating polling messages to a plurality of addressable stations including the steps of:
generating in a CPU a table of addresses of said stations in the order in which they are to be polled;
storing said table in an automatic polling device external to said CPU;
utilizing the addresses in said polling table in succession to generate polling messages from said automatic polling device to the addressed remote stations;
receiving responses at said automatic polling device from the polled remote stations and testing each response to determine if it is positive or negative;
generating a poll message to the station indicated by the next address in the poll table each time a negative response is received to a poll message;
and generating an interrupt to the CPU, permitting the CPU to receive a message from the automatic polling device, each time a positive response is received to a poll message.

21. A method of the type described in claim 20 including the steps of:
testing to determine if a response is received to a poll message within a predetermined period of time;
and generating an interrupt and a no-response message to the CPU if a response is not received within said predetermined period of time.

22. A method of the type described in claim 20 including the steps of:
testing to determine if the end of the polling table has been reached;
and generating an interrupt and an end-of-table message to the CPU when the end of the polling table is reached.

* * * * *

UNITED STATES PATENT OFFICE
CERTIFICATE OF CORRECTION

Patent No. 3,665,406 Dated May 23, 1972

Inventor(s) Frank William Gallagher, et. al.

It is certified that error appears in the above-identified patent and that said Letters Patent are hereby corrected as shown below:

Column 9, cancel claim 5 and insert the following instead:

5. A device of the type described in claim 2 wherein said condition detecting means includes means for detecting an error response to a poll message. -- .

Signed and sealed this 26th day of December 1972.

(SEAL)
Attest:

EDWARD M.FLETCHER,JR.
Attesting Officer

ROBERT GOTTSCHALK
Commissioner of Patents